Sept. 14, 1954 W. K. McKINLEY 2,688,950
ANIMAL CONTACT INSECTICIDE APPLICATOR
Filed Nov. 15, 1951
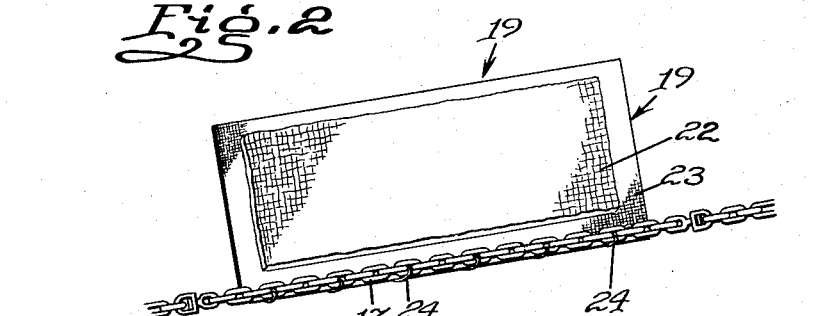
Fig. 2
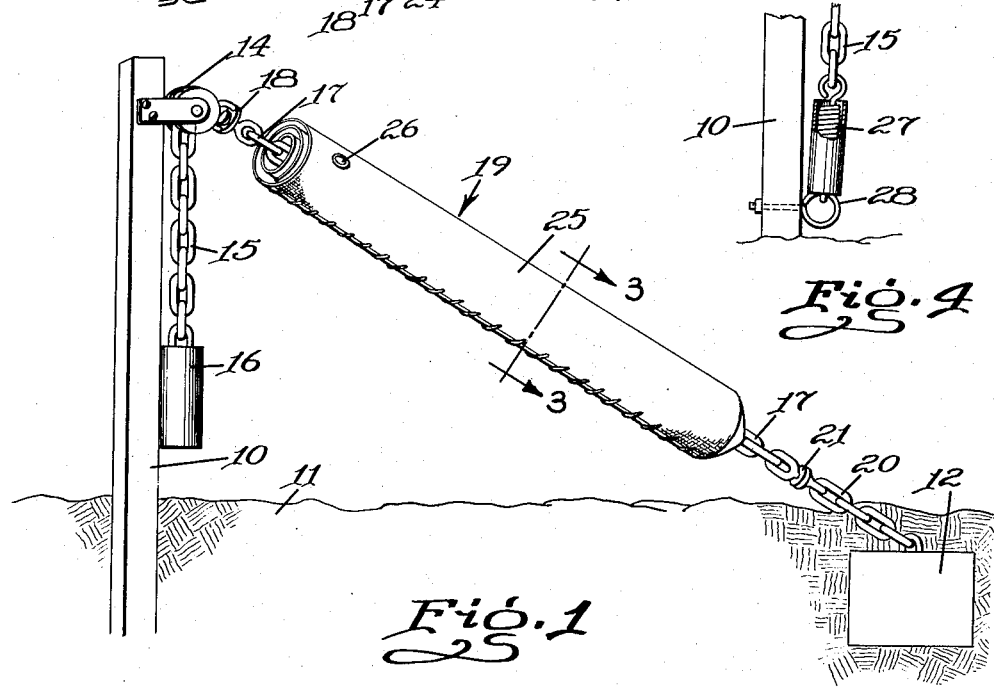
Fig. 1
Fig. 4
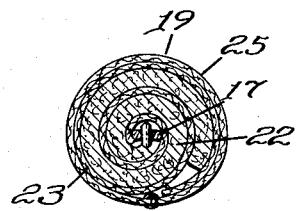
Fig. 3
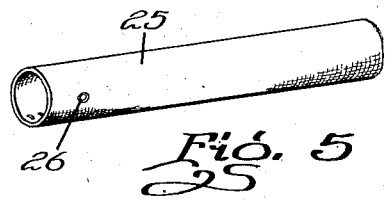
Fig. 5
INVENTOR.
Wade Kent McKinley
BY Victor J. Evans & Co.
ATTORNEYS Patented Sept. 14, 1954

2,688,950

UNITED STATES PATENT OFFICE 2,688,950

ANIMAL CONTACT INSECTICIDE APPLICATOR

Wade Kent McKinley, Colorado Springs, Colo.

Application November 15, 1951, Serial No. 256,568

3 Claims. (Cl. 119—157)

This invention relates to an applicator, and more particularly to a device for applying insecticide to cattle.

The object of the invention is to provide an applicator which is adapted to receive a quantity of suitable fluid or liquid insecticide for killing lice, grubs, flies, ectoparasites and the like whereby when cattle rub against the applicator, the liquid insecticide will be automatically applied to the cattle to kill the vermin on the cattle.

The present invention relates to the mechanical application of insecticides to cattle without resort to spraying or dipping. Thus, since biting and sucking insects cause cattle to itch, the cattle have a natural tendency to scratch and rub themselves whenever possible, and this natural habit of rubbing and scratching is utilized in the present invention to apply the insecticide automatically. The applicator is constructed or placed and erected so that animals can use the device to rub or scratch any part of their bodies where insects bite and suck, and the applicator is saturated with liquid insecticide so that the insecticide will be applied to whatever part of the body that is being rubbed or scratched.

In the accompanying drawings, forming a part of this application, and in which like numerals are used to designate like parts throughout the same:

Figure 1 is a perspective view showing the applicator of the present invention, and with portions broken away and in section to show certain constructional details of the invention.

Figure 2 is a fragmentary plan view showing the method of forming and attaching the applicator to one of the chain sections.

Figure 3 is a transverse sectional view taken through the applicator on line 3—3 of Figure 1.

Figure 4 is a fragmentary elevational view showing a modification wherein a spring is used instead of a weight.

Figure 5 is a perspective view of the cover for the applicator.

Referring in detail to the drawings, the numeral 10 designates a vertically disposed post which is adapted to have its lower end embedded in the ground 11, as shown in Figure 1. Spaced from the post 10 and also embedded in the ground 11 is an anchor 12 which may consist of a concrete block, or any conventional ground anchor or dead man. Secured to the post 10 and arranged adjacent the upper end thereof is a guide member 14, and a first chain section 15 is arranged in engagement with the guide member 14. Connected to the lower end of the chain section 15 is a biasing means which in Figure 1 consists of a weight 16.

There is further provided a second chain section 17 which is swivelly connected to the first chain section 15 by means of a swivel joint 18. Mounted on the second chain section 17 is a cylindrical applicator 19.

The applicator 19 includes a central portion 22 which can be made of any suitable material such as heavy felt or similar wicking, and secured to the central portion 22 is a reinforcing fabric or canvas sheet 23. One edge of the reinforcing sheet 23 is secured to the second chain section 17 in any suitable manner, as for example by means of securing elements 24. The applicator is arranged as a roll, and a cylindrical cover 25 is positioned over the roll, the cover 25 being shown in Figure 5. The cover 25 is provided with an opening 26 adjacent its upper end whereby liquid or fluid insecticide can be poured through the opening 26 to saturate the applicator.

Referring to Figure 4 of the drawings, there is shown a modification wherein the biasing means for the chain section 15 includes a coil spring 27 instead of the weight 16. Thus, the upper end of the coil spring 27 is connected to the lower end of the chain section 15, while the lower end of the coil spring 27 is secured to a suitable anchoring member 28 which is connected to the post 10. The heavy felt or wicking 22 may be reinforced with canvas or other material 23. The weight 16 or the spring 27 serves to hold the applicator taut. The spring 27 may be encased in a protective shield to prevent the coils of the spring from catching and pulling the animals' hair or skin. The cover 25 is made of extra heavy material and is provided with the opening 26 so that the applicator can be filled with insecticide. The insecticide is poured into the opening 26 and it follows the chain or cable downwards to thoroughly saturate the wicking roll throughout its entire length. The reinforced wicking material is firmly attached to the support chain or cable at 24. The material is then wrapped around the support chain section 17 and then the cover 25 is slipped on. The cover 25 gives added strength to the wicking roll and enables it to better withstand the severe hard rubbing by heavy animals. The guide member 14 may be a pulley or ringbolt through which passes the supporting chain or cable section 15. The anchor or dead man 12 is sunk into the ground 11 far enough away from the post 10 to maintain the applicator roll taut and the applicator is arranged at an angle so that the weight 16 is arranged six or eight inches above the ground. The wicking roll swivels at 18 and 21 as the animal rubs and scratches to thereby continually bring fully saturated parts of the wicking roll in contact with the body of the animal since the applicator is round. The biasing means maintains the wicking roll taut so that the animal will rub the insecticide against the skin as well as against the hair. The applicator can be used by the animal to reach all parts of the body. Thus, when the animal straddles the applicator roll, the insecticide will be applied under the belly, neck, bricket and scrotum and/or udder. When the animal is alongside of the applicator, the animal may rub the side of the head and nose, under the jaws, under the neck, along its sides, as well as on the legs, to thereby apply the insecticide to these parts. Also, the animal may scratch and rub behind the ears, the back of the neck as well as along the entire back, and by backing up to the applicator the animal can scratch and rub the root of the tail. Thus, the insecticide applicator of the present invention can be used for applying insecticides to all parts of the body where lice, grubs or flies may be.

The applicator is constructed of material having high absorption capacity and it can be made rugged enough to withstand hard treatment by large animals and still have sufficient holding capacity to treat many animals without recharging. Also, the applicator is in a shape or form that readily conforms to the configuration of the body of the animal. The applicator can be readily recharged or refilled whenever desired by pouring the insecticide through the opening 26. Due to the provision of the swivels 18 and 21, the round applicator will roll or rotate as the animal rubs to bring fully saturated areas of the roll adjacent the animal body to assure or insure that sufficient quantities of insecticide are applied. The tautness of the applicator will offer sufficient resistance to the rubbing of the animal so that the insecticide will be applied beneath the hair upon the skin where lice and warbles are found. The biasing means causes the applicator roll to adapt itself more closely to the uneven contours of the animal body and also allows the higher portions of the roll to be lowered while still being kept taut so that the applicator can be straddled and the applicator can accommodate itself to small as well as large animals. The insecticide is applied automatically to the animals so that it will not be necessary to spray or dip the animals for lice, warbles or flies. Thus, animals frequently itch due to the biting and sucking of insects and other factors, and since animals naturally rub or scratch themselves to relieve the itching, they will use the applicator frequently without the necessity of forcing the animal to be disinfected so that the insecticide will be applied in a more natural way without fear, excitement or exertion, as in the case when dipping or spraying is utilized. When sprays or dips are used, there are many delays when the insects multiply unhindered as soon as the residual effects of the insecticide diminish. This depletes the energy of the cattle until the pests become numerous enough to attract the attention of the cattleman, thus inducing him to spray or dip again, but with the present invention there are no delays because the animal will use the applicator whenever itching becomes severe enough to make the animal rub or scratch. Thus, the present invention can be used with very little time or labor on the part of the cattleman and also there will be a reduced cost in applying the insecticide and there will be less danger of injuries suffered by the cattle during the spraying and dipping.

I claim:

1. In combination a vertically disposed post, a guide member supported by said post and positioned adjacent the upper end of said post, an anchor spaced from said post, a first chain section arranged in engagement with said guide member, biasing means connected to the lower end of said first chain section, a second chain section swivelly connected to said first chain section and arranged angularly with respect to said post, a third chain section swivelly connected to said second chain section and secured to said anchor, an inclined applicator mounted on said second chain section, and including a central portion arranged as a roll, a reinforcing sheet surrounding said central portion, a cover mounted on said applicator and provided with a filling opening adjacent its upper end, means securing said applicator to said second chain section, the filling opening in said cover adapted to have liquid insecticide poured therein.

2. The apparatus as described in claim 1, wherein said biasing means comprises a weight.

3. The apparatus as described in claim 1, wherein said biasing means comprises a spring.

References Cited in the file of this patent

UNITED STATES PATENTS

| Number | Name | Date |
|---|---|---|
| 1,305,965 | Doty | June 3, 1919 |
| 1,471,109 | Dick | Oct. 16, 1923 |
| 1,999,122 | Clark et al. | Apr. 23, 1935 |
| 2,581,028 | Kirk | Jan. 1, 1952 |

OTHER REFERENCES

Successful Farming, July 1952, page 64.